Patented May 3, 1949

2,469,320

UNITED STATES PATENT OFFICE 2,469,320

COATING COMPOSITIONS EMBODYING POLYVINYL BUTYRAL RESINS AND METHODS OF MAKING SAME

Donald R. Swan, Berea, Ohio, assignor, by mesne assignments, to Pittsburgh Plate Glass Company, Pittsburgh, Pa., a corporation of Pennsylvania No Drawing. Application February 15, 1946, Serial No. 648,013

1 Claim. (Cl. 260—29.1)

This invention relates to methods for preparing coating materials particularly useful in the finishing arts and to coating materials prepared by such methods. In my copending application Serial No. 648,012 for Sanding sealers embodying polyvinyl butyral resins filed of even date herewith, I disclose and claim various compositions of sanding sealers containing polyvinyl butyral. The present application specifically discloses a method of making such sanding sealers, but it is to be understood that the method disclosed herein may also be employed in the manufacture of other coating materials such as lacquers and the like.

As described in greater detail in my above mentioned application, polyvinyl butyrals are useful in the coating arts because of their toughness, adhesiveness and other desirable characteristics. Other polyvinyl acetal resins have also found use in the coating arts, but the extent of use of polyvinyl butyrals and other polyvinyl acetals in coating materials has been restricted because of the difficulty of isolating the resins from the reaction solutions in which they are produced and thereafter purifying them. The difficulty and high cost of the precipitation and purifying operations is particularly marked in the case of resins of the lower ranges of viscosity, and resins of low viscosity are required in coating materials which can be sprayed with reasonable concentrations of solids.

A general object of the present invention is the provision of a method of producing solutions of polyvinyl resins, and specifically solutions of polyvinyl butyral (the butyraldehyde acetal of polyvinyl alcohol) and other polyvinyl acetal resins, which can be used directly in the manufacture of coating materials without requiring that the resins be precipitated from the solutions and washed and dried. More specifically, an object of the invention is the provision of a method of preparing solutions of polyvinyl butyral and the acetaldehyde acetal of polyvinyl alcohol especially adapted for the production of coating materials. Another object is the provision of a method of making sanding sealers containing polyvinyl butyral and the acetaldehyde acetal of polyvinyl alcohol without requiring the separation of the resins from the solution in which they are produced.

Briefly, according to my invention, the steps of precipitating and washing the resins and then redissolving them to make the coating compositions are all eliminated by reacting polyvinyl alcohol, acetaldehyde, (ordinarily supplied by a material which will give acetaldehyde in solution, e. g., paraldehyde or its equivalents) butyraldehyde and a small amount of mineral acid as a catalyst, in an appropriate organic solvent such as ethyl alcohol, for a sufficient time for the reactions to go to substantial completion, adding sufficient sodium hydroxide to neutralize the acid, diluting the solution with appropriate solvents and then filtering. This produces a clear, neutral solution containing a mixed butyraldehyde and acetaldehyde acetal of polyvinyl alcohol, i. e., a resin in which both types of acetals are present in the same molecule; these resins are referred to hereafter in this specification as "butyracetal" resins. The solution of the resins may be used in the production of coating materials, requiring only the addition of such solvents, other resins or modifying agents as may be necessary to produce a material of the character desired.

The characteristics of the resins may be varied by varying the degree of polymerization of the polyvinyl alcohol used and by varying the relative proportions of paraldehyde and butyraldehyde employed. The greater the degree of polymerization of the alcohol, the greater its viscosity and the greater the viscosity of the resulting butyracetal resin. For most purposes, I prefer to employ polyvinyl alcohol having a viscosity of about 5 centipoises in 4 percent solution in water at 20° C. The percentages of polyvinyl butyral and the acetaldehyde acetal of polyvinyl alcohol in the final solution correspond approximately to the relative percentages of butyraldehyde and paraldehyde added to the polyvinyl alcohol. Greater percentages of butyraldehyde produce tougher, more adherent coating materials because of the presence of greater percentages of polyvinyl butyral in the ultimate product. However, a coating material prepared only from polyvinyl butyral solution does not dry quickly enough for practical use as a sanding sealer. By adding acetaldehyde to the reaction mixture and producing the butyracetal resin noted above, the drying time can be reduced, and the desirable characteristics of toughness and adhesion of the butyral substantially retained, although if no butyraldehyde is used in the reaction so that the resin is entirely the acetaldehyde acetal of polyvinyl alcohol, the coating materials do not produce as tough a film as can be obtained with the mixed resin to which the present invention is particularly directed.

The reason for the difference in drying time of coating compositions containing only the polyvinyl butyral resins produced directly from the reaction solution and those containing butyracetal resins of the present invention is apparently that the aldehydes when added to the solution of polyvinyl alcohol and ethyl alcohol react first with the ethyl alcohol present to form acetals of ethyl alcohol, thus:

(1)

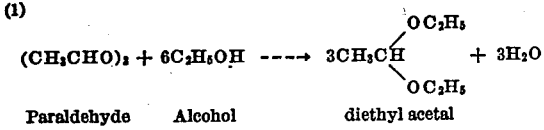

Paraldehyde    Alcohol    diethyl acetal (2) $CH_3CH_2CH_2CHO + 2C_2H_5OH \longrightarrow$
    Butyraldehyde    Alcohol

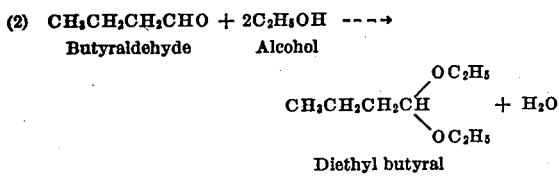

Diethyl butyral

These diethyl acetals then react with the polyvinyl alcohol to form the desired resins. However, these last reactions never go to completion so that the solution always contains a residual amount of diethyl acetal and diethyl butyral. Diethyl butyral has a relatively high boiling point, and thus if only butyraldehyde were used in the reaction, there would be sufficient diethyl butyral present in the final solution to prevent satisfactory quick air drying of the coating material. However, the diethyl acetal of acetaldehyde has a much lower boiling point than diethyl butyral, and because of this fact, the drying characteristics of the butyracetal resin solution are satisfactory so long as the mole ratio of butyraldehyde to paraldehyde used in the initial reaction does not exceed about 2 to 1. On the other hand, in order to secure the desired toughness produced by the polyvinyl butyral, the ratio of butyraldehyde to paraldehyde in the reaction solution should not be less than about 1 to 2. The following examples illustrate the invention as applied to the manufacture of sanding sealers of the type described and claimed in my aforesaid application:

*Example 1.*—To 88 grams polyvinyl alcohol (of 5 centipoise viscosity in a 4 percent solution in water at 20° C.) suspended in 500 cc. of denatured alcohol were added (in order) 2 grams of sulfuric acid (sp. g. 1.85), 19.8 grams of paraldehyde and 32.4 grams of butyraldehyde. After 24 hours at 50° C. with intermittent stirring, the reaction was substantially complete.

Sodium hydroxide in solution in ethyl alcohol was then added until the pH of the solution was about 6.

The resulting viscous solution was then thinned by adding 1125 cc. of a 50-50 mixture of hexone and methyl ethyl ketone, producing a sprayable consistency. The solution was then filtered through fast filter paper on a Buchner funnel. The product was clear and light yellow in color, and 1000 cc. of the solution contained 67.3 grams of resin by direct determination of non-volatile content.

A sanding sealer was prepared from the resin solution as follows:

To 1000 cc. of the above filtered solution was added 5.8 grams of zinc stearate. The solution of resin containing zinc stearate was ground in a pebble mill for 18 hours. At the end of this time the zinc stearate was well dispersed and while it settled somewhat on standing, was easily redispersed.

When sprayed on wood the composition dried rapidly and could be sanded readily in less than one hour.

*Example 2.*—The following ingredients were mixed in the order indicated and reacted during two days at 50° C. with occasional stirring:

| | | |
|---|---|---|
| Polyvinyl alcohol (of 5 centipoise viscosity in a 4% solution in water at 20° C.) | g | 264 |
| 95% ethyl alcohol | cc | 1500 |
| Sulfuric acid (sp. g. 1.85) | cc | 10 |
| Butyraldehyde (97.2 g.) | cc | 120 |
| Paraldehyde (59.4 g.) | cc | 50 |

The resulting thick, somewhat hazy dope was neutralized with 181 cc. of a solution made by dissolving 100 grams sodium hydroxide in 1000 cc. of ethyl alcohol. The resulting solution had a pH of about 7.

Solvents were then added as follows to facilitate filtering and to provide suitable consistency for spraying:

| | | |
|---|---|---|
| Toluene | cc | 1600 |
| Methyl ethyl ketone | cc | 900 |
| Petroleum naphtha (B. P. 93°-112° C.) | cc | 500 |

The resin solution was filtered with pressure through paper to remove sodium sulfate and gel particles.

Thereafter a sanding sealer was prepared by grinding 21 grams of zinc stearate into 3525 cc of the resin solution and adding 87.5 grams of ½-second nitrocellulose. This amount of nitrocellulose improves the sanding qualities and does not substantially detract from the toughness of the final system.

The resulting sanding sealer consisted of the following:

| | | |
|---|---|---|
| Polyvinyl "butyracetal" | g | 262.0 |
| ½-sec. nitrocellulose (65%) (50 g. dry wt.) | g | 87.5 |
| Zinc stearate | g | 21.0 |
| Denatured alcohol | cc | 1500.0 |
| Toluol | cc | 1600.0 |
| Petroleum naphtha (B. P. 93°-112° C.) | cc | 500.0 |
| Methyl ethyl ketone | cc | 900.0 |

When sprayed on wood the composition dried quickly and was sanded after ½ hour without drag or gumming, and was somewhat better than Example 1. When 2 coats of clear lacquer were applied over the sealer, hold-out was equivalent to conventional sealers. Comparative tests of the sealer-lacquer system showed much greater toughness than a standard system embodying a conventional sealer and the same lacquer.

Other coating materials, such as finishing lacquers, can be made by similar methods. For example, a very tough lacquer can be produced by adding 70 grams of ¼-second nitrocellulose (14 g. dry wt.) solution to 200 grams of a filtered resin solution produced as described in example 2 above. Two coats of this lacquer were sprayed on a gumwood panel, with light sanding between coats. The resulting film was thin and very tough, and without high luster or gloss. The lacquer thus is especially suitable for finishing certain types of fine furniture.

From the foregoing, it will be evident that by my method, coating compositions having the desirable characteristics imparted by polyvinyl butyral and other acetals of polyvinyl alcohol can be produced at relatively low cost because of the eliminations of the steps of precipitating, washing, drying and redissolving the resins heretofore required in the production of coating compositions containing such materials. Inasmuch as the solvents in which the reactions take place are used in the final product, there are no problems of solvent recovery and the cost of the solvents used in the reactions can be considered as pratically nil. The reduction in cost of manufacture increases the range of usefulness in such coating compositions. Various characteristics can be obtained in the final coating material by varying the proportions of aldehydes used in the initial reactions with polyvinyl alcohol and by varying the viscosity of the polyvinyl alcohol. The invention has been described herein particularly with reference to the production of sanding sealers and finishing lacquers. Those skilled in the art, however, will understand that the invention may be applied to the production of other coating compositions, adhesives and the like, and that the foregoing examples are given by way of illustration only and not as limiting the invention.

I claim:

The method of producing coating compositions of sprayable consistency which includes the steps of adding to polyvinyl alcohol in a suspension in an organic solvent a mixture of butyraldehyde and acetaldehyde having mole ratios of from 1 to 2 of butyraldehyde and from 2 to 1 of acetaldehyde in the presence of a mineral acid catalyst promoting interaction of the various reagents and production of a solution of mixed polyvinyl acetal resins, neutralizing the solution of resins, filtering the solution, and, without in the meanwhile precipitating the resins, diluting the solution with an organic solvent to a viscosity suitable for spraying purposes, the polyvinyl alcohol used in producing the resins being one having a viscosity of substantially 5 centipoises in a 4 percent solution in water at 20° C.

DONALD R. SWAN.

REFERENCES CITED

The following references are of record in the file of this patent:

UNITED STATES PATENTS

| Number | Name | Date |
|---|---|---|
| 2,227,975 | Kenyon | Jan. 7, 1941 |
| 2,269,217 | McNally | Jan. 6, 1942 |
| 2,271,668 | Swan | Feb. 3, 1942 |

FOREIGN PATENTS

| Number | Country | Date |
|---|---|---|
| 483,222 | Great Britain | Apr. 8, 1938 |